(12) United States Patent
Motohashi

(10) Patent No.: US 9,964,174 B2
(45) Date of Patent: May 8, 2018

(54) ELECTROMAGNETIC ACTUATOR FOR ACTIVE VIBRATION ISOLATION SYSTEM

(71) Applicant: Keihin Corporation, Tokyo (JP)

(72) Inventor: Ken Motohashi, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 285 days.

(21) Appl. No.: 14/858,402

(22) Filed: Sep. 18, 2015

(65) Prior Publication Data

US 2016/0084337 A1    Mar. 24, 2016

(30) Foreign Application Priority Data

Sep. 24, 2014  (JP) .................................. 2014-194039

(51) Int. Cl.
*H02K 33/00* (2006.01)
*F16F 13/26* (2006.01)
*H02K 33/08* (2006.01)

(52) U.S. Cl.
CPC ............. *F16F 13/26* (2013.01); *H02K 33/08* (2013.01)

(58) Field of Classification Search
CPC ......... H02K 33/00; H02K 33/12; H02K 33/14
See application file for complete search history.

(56) References Cited

U.S. PATENT DOCUMENTS

| | | | | |
|---|---|---|---|---|
| 2,835,831 A | * | 5/1958 | Harrington | ............ H02K 33/10 |
| | | | | 310/32 |
| 5,011,380 A | * | 4/1991 | Kovacs | .................. B29C 33/40 |
| | | | | 417/413.1 |
| 7,679,228 B2 | * | 3/2010 | Tahara | .................. F16F 13/268 |
| | | | | 267/140.14 |

FOREIGN PATENT DOCUMENTS

JP         2010-196758 A        9/2010

* cited by examiner

*Primary Examiner* — Dang Le
(74) *Attorney, Agent, or Firm* — Westerman, Hattori, Daniels & Adrian, LLP

(57) ABSTRACT

An electromagnetic actuator for an active vibration isolation system, the electromagnetic actuator includes: a fixed core; a movable core that is opposed to the fixed core and is joined to a vibration member; and a coil unit having coils that surround part of the fixed core and the movable core. The movable core and the vibration member are vibrated in a reciprocating manner by energization to the coils, and the coils include a main coil to which an alternating current with a waveform corresponding to vibrations of a vibration generation source is input and a sub-coil that amplifies magnetic flux generated by the main coil.

5 Claims, 2 Drawing Sheets

ELECTROMAGNETIC ACTUATOR FOR ACTIVE VIBRATION ISOLATION SYSTEM

CROSS REFERENCE TO RELATED APPLICATION

The present application claims priority under 35 U.S.C. § 119 to Japanese Patent Application No. 2014-194039 filed in the Japan Patent Office on Sep. 24, 2014, the entire content of which is hereby incorporated by reference.

TECHNICAL FIELD

The present invention relates to the following electromagnetic actuator for an active vibration isolation system. Specifically, the electromagnetic actuator includes a fixed core, a movable core that is opposed to the fixed core and is joined to a vibration member, and a coil unit having coils that surround part of the fixed core and the movable core. The electromagnetic actuator vibrates the movable core and the vibration member in a reciprocating manner by energization to the coils.

BACKGROUND OF THE INVENTION

The following electromagnetic actuator for an active vibration isolation system is known due to Japanese patent laid-open publication No. 2010-196758 ("JP '758"). Specifically, the electromagnetic actuator eliminates high-order components of a vibration force generated when a pulse voltage with a predetermined frequency is applied to only one coil by controlling a pulse voltage applied to each of first and second coils that are disposed to overlap with each other in the axial direction and configure a coil unit.

SUMMARY OF THE INVENTION

There is a demand to increase the thrust exerted by the electromagnetic actuator. However, it may be impossible for the electromagnetic actuator disclosed in JP '758 to meet such a demand.

The present invention provides an electromagnetic actuator for an active vibration isolation system allowing increase in the thrust.

The present invention provides an electromagnetic actuator for an active vibration isolation system as a first characteristic. Specifically, the electromagnetic actuator includes a fixed core, a movable core that is opposed to the fixed core and is joined to a vibration member, and a coil unit having coils that surround part of the fixed core and the movable core. The movable core and the vibration member are vibrated in a reciprocating manner by energization to the coils. The coils include a main coil to which an alternating current (AC) with a waveform corresponding to vibrations of a vibration generation source is input and a sub-coil that amplifies magnetic flux generated by the main coil.

Furthermore, the present invention provides the following configuration as a second characteristic. Specifically, in addition to the configuration of the first characteristic, the sub-coil is disposed adjacent to one end of the main coil in an axial direction and coaxially with the main coil.

Moreover, the present invention provides the following configuration as a third characteristic. Specifically, in addition to the configuration of the first characteristic, the sub-coil is disposed on one of an inner circumferential side and an outer circumferential side of the main coil and coaxially with the main coil.

According to the first characteristic of the present invention, the magnetic flux generated by the main coil due to the input of the AC with the waveform corresponding to the vibrations of the vibration generation source is amplified by magnetic flux generated by the sub-coil. This can raise the level of the vibration force generated in the electromagnetic actuator and increase the thrust exerted by the electromagnetic actuator.

Furthermore, according to the second characteristic of the present invention, the main coil and the sub-coil configuring the coil unit are disposed adjacent to each other in the axial direction. Thus, increase in the size of the coil unit in the radial direction can be suppressed and slimming of the electromagnetic actuator can be achieved to improve the layout when the electromagnetic actuator is placed.

Moreover, according to the third characteristic of the present invention, the main coil and the sub-coil configuring the coil unit overlap with each other in the radial direction. This can suppress increase in the size of the coil unit in the axial direction and keep the position of the center of gravity low to stably hold the vibration generation source.

BRIEF DESCRIPTION OF THE DRAWINGS

The advantages of this invention will become apparent in the following description taken in conjunction with the drawings, wherein.

DETAILED DESCRIPTION OF THE INVENTION

Embodiments of the present invention will be described with reference to the accompanying drawings.

Figure 1:
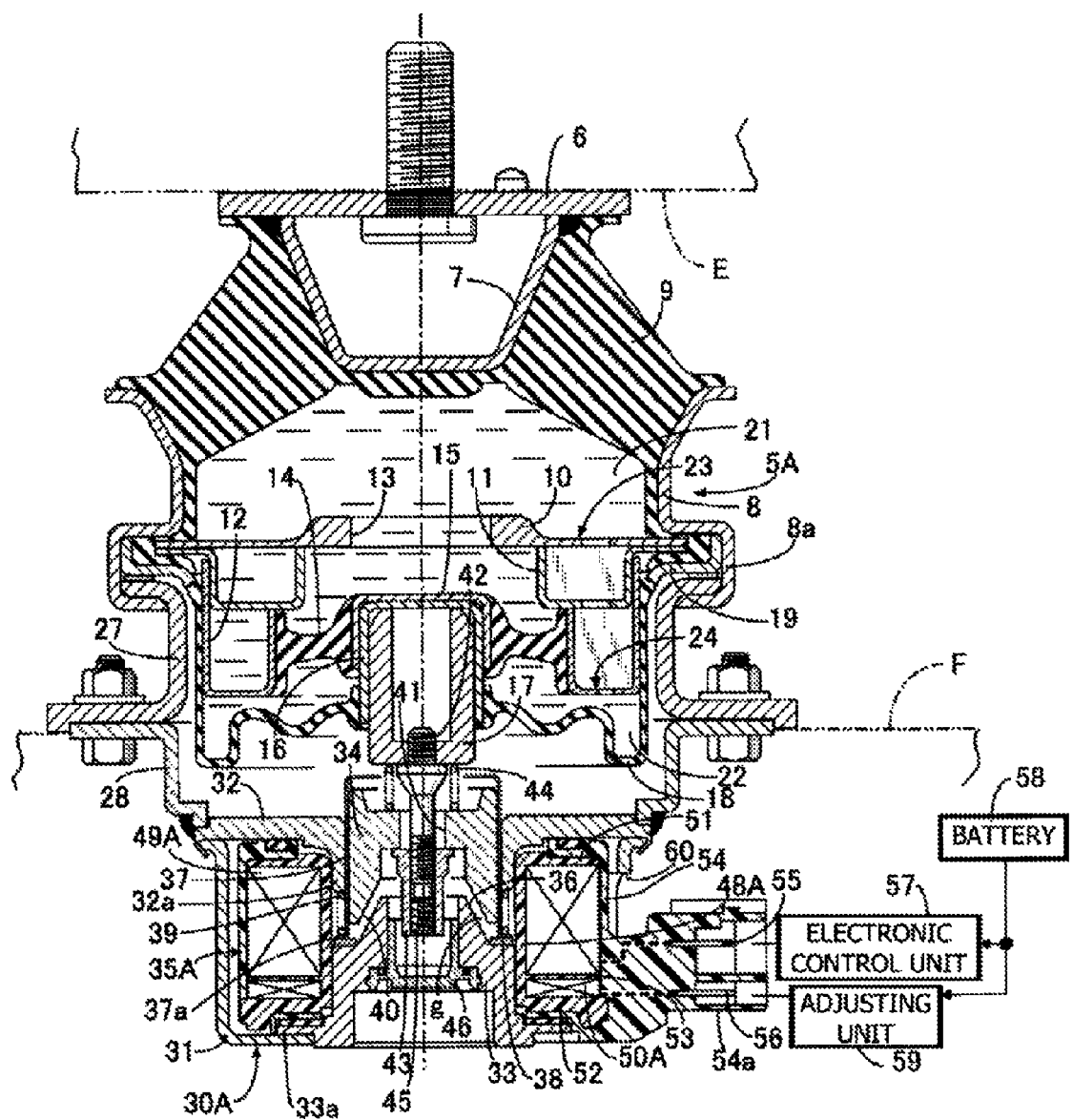
FIG. 1 is a longitudinal sectional view of an active vibration isolation system of a first embodiment.

A first embodiment of the present invention will be described with reference to FIG. 1. This active vibration isolation system 5A is a device that is provided between an engine E of e.g. a car as a vibration generation source and a vehicle body frame F as a vibration insulation target and is to actively suppress transmission of vibrations generated by the engine E to the vehicle body frame F.

This active vibration isolation system 5A includes an attachment bracket 6 that is joined to the engine E and has a circular plate shape, an inner cylinder 7 welded to the attachment bracket 6, an outer cylinder 8 disposed coaxially with the inner cylinder 7, and a first elastic body 9 that is formed of thick rubber or the like and is vulcanization-bonded between circular conical surfaces of the inner cylinder 7 and the outer cylinder 8 opposed to each other. The active vibration isolation system 5A further includes a first orifice forming member 10, a second orifice forming member 11, and a third orifice forming member 12 that are lined up in the upward-downward direction to be integrated with each other and are disposed below the first elastic body 9.

The first orifice forming member 10 has an opening 13 at its central part and is formed into a circular plate shape. The second orifice forming member 11 is formed into a ring shape with a gutter-shaped section whose upper surface is opened, and is joined to the first orifice forming member 10, with the opened upper surface closed by the first orifice forming member 10. The third orifice forming member 12 is formed into a ring shape with a gutter-shaped section whose upper surface is opened, and is joined to the second orifice forming member 11, with the opened upper surface closed by the second orifice forming member 11. The outer circumferential parts of the first and second orifice forming members 10 and 11 are overlapped with each other and are fixed to a ring-shaped swaging fixing part 8a provided at the lower part of the outer cylinder 8.

The outer circumferential surface of a ring-shaped second elastic body 14 composed of rubber or the like is vulcanization-bonded to the inner circumferential surface of the third orifice forming member 12. A first cap 15 having a bottomed circular cylindrical shape with a closed upper end is vulcanization-bonded to the inner circumferential surface of this second elastic body 14. A second cap 16 having a bottomed circular cylindrical shape with a closed upper end is press-fitted in the first cap 15. A vibration member 17 having a bottomed circular cylindrical shape with a closed lower end is press-fitted in the second cap 16.

The inner circumferential part of a diaphragm 18 disposed below the second elastic body 14 is vulcanization-bonded to the outer circumferential surface of the protruding part of the second cap 16 from the lower end of the first cap 15. A ring member 19 is vulcanization-bonded to the outer circumferential part of the diaphragm 18. This ring member 19 is fixed to the swaging fixing part 8a of the outer cylinder 8 together with the outer circumferential parts of the first orifice forming member 10 and the second orifice forming member 11.

A thrust can be applied from an electromagnetic actuator 30A to the vibration member 17. In response to the application of the thrust from the electromagnetic actuator 30A to the vibration member 17, the vibration member 17 is driven to vertically reciprocate in such a manner as to bend the second elastic body 14 and the diaphragm 18.

A first liquid chamber 21 is defined between the first elastic body 9 and the second elastic body 14. A second liquid chamber 22 is defined between the second elastic body 14 and the diaphragm 18. A liquid is enclosed in the first and second liquid chambers 21 and 22.

An upper orifice 23 is formed between the first orifice forming member 10 and the second orifice forming member 11. A lower orifice 24 is formed between the second orifice forming member 11 and the third orifice forming member 12. The first and second liquid chambers 21 and 22 communicate with each other via the upper orifice 23 and the lower orifice 24, which are connected in series.

A cylindrical bracket 27 attached to the vehicle body frame F is fixed to the swaging fixing part 8a of the outer cylinder 8. By an actuator support member 28 fastened to this bracket 27, the electromagnetic actuator 30A to vertically drive the vibration member 17 is supported.

This electromagnetic actuator 30A includes a housing 31 formed into a cylindrical shape with an opened upper end by a magnetic material and a yoke 32 fastened to the housing 31 to close the upper end opening of the housing 31. The electromagnetic actuator 30A further includes a fixed core 33 fastened to the central part of the lower part of the housing 31, a movable core 34 opposed to the fixed core 33 from the upper side of the fixed core 33, and a coil unit 35A surrounding part of the fixed core 33 and the movable core 34. The outer circumferential part of the yoke 32 is welded to the lower end part of the actuator support member 28.

The fixed core 33 is formed into a circular cylindrical shape. It has a tapered attracting surface 36 at its upper part and has a flange part 33a extending outward in the radial direction at its lower part. The flange part 33a is joined to the lower part of the housing 31 in such a manner as to overlap with it from the upper side. The yoke 32 is joined to the upper part of the housing 31, with the coil unit 35A interposed between the yoke 32 and the flange part 33. A circular cylindrical part 32a inserted in the coil unit 35A is formed monolithically with the central part of the yoke 32.

In the circular cylindrical part 32a, a bearing member 37 that has an outward flange part 37a at its lower end part and has a thin-walled circular cylindrical shape is fitted. An elastic plate 38 formed into a thin ring shape is interposed between the fixed core 33 and the outward flange part 37a. A coil spring 39 for elastically holding the bearing member 37 to the side of the fixed core 33 is provided in a compressed state between the outward flange part 37a and the lower end of the circular cylindrical part 32a.

The movable core 34 has, as its lower end surface, an attracting surface 40 opposed to the attracting surface 36 of the fixed core 33 with the intermediary of an air gap g and is slidably fitted in the bearing member 37. The upper end of a joining bolt 42 that loosely penetrates through a through-hole 41 the movable core 34 has at its central part is screwed to the vibration member 17. To the lower end of the joining bolt 42, an adjusting nut 43 that abuts against the movable core 34 from below is screwed. A coil spring 44 is provided in a compressed state between the vibration member 17 and the movable core 34. The movable core 34 is elastically clamped by the adjusting nut 43 monolithic with the vibration member 17 and the coil spring 44.

The air gap g between the attracting surfaces 36 and 40 of the fixed core 33 and the movable core 34 can be adjusted by making advance and retreat of the position of the screwing of the adjusting nut 43 to the joining bolt 42. The advance/retreat position of the adjusting nut 43 relative to the joining bolt 42 is fixed by screwing a locknut 45 to the adjusting nut 43 from below. Rotational operation of this locknut 45 can be carried out by engaging a tool inserted into the fixed core 33 from below with the locknut 45 in a state in which a plug member 46 attachably/detachably mounted to the lower part of the fixed core 33 is removed.

The coil unit 35A includes a bobbin 48A that surrounds part of the fixed core 33 and the circular cylindrical part 32a of the yoke 32 and is made of a resin, and a main coil 49A and a sub-coil 50A that are fitted into this bobbin 48A.

The bobbin 48A is formed to have an upper flange part 51 at its upper end, a lower flange part 52 at the lower end, and an intermediate flange part 53 disposed closer to the lower flange part 52. The main coil 49A is wound around the bobbin 48A between the upper flange part 51 and the intermediate flange part 53 and the sub-coil 50A is wound around the bobbin 48A between the intermediate flange part 53 and the lower flange part 52. That is, the sub-coil 50A is disposed adjacent to one end of the main coil 49A in the axial direction (lower end, in this embodiment) and coaxially with the main coil 49A, whereby the sub-coil 50A and the main coil 49A are aligned in the axial direction and abut each other at their opposite axial ends.

The winding of such main coil 49A and sub-coil 50A around the bobbin 48A can be carried out as follows for example. Specifically, the main coil 49A and the sub-coil 50A are wound around a jig and then the jig is removed. In this state, the bobbin 48A is formed by outsert molding.

The bobbin 48A, the main coil 49A, and the sub-coil 50A are covered by a cover part 54 made of a resin. A coupler part 54a protruding outward from an opening 60 formed at the lower part of the housing 31 is formed monolithically with this cover part 54. In this coupler part 54a, a main-coil coupler terminal 55 communicating with the main coil 49A and a sub-coil coupler terminal 56 communicating with the sub-coil 50A are disposed.

An electronic control unit 57 is connected to the main-coil coupler terminal 55. This electronic control unit 57 converts a current supplied from a battery 58 to an AC with a waveform corresponding to vibrations of the engine E and inputs the AC to the main-coil coupler terminal 55, i.e. the main coil 49A.

An adjusting unit 59 composed of plural resistor elements and so forth is connected to the sub-coil coupler terminal 56. This adjusting unit 59 adjusts the current supplied from the battery 58 to a constant direct current (DC) and inputs the DC to the sub-coil coupler terminal 56, i.e. the sub-coil 50A, in order to amplify magnetic flux generated by the main coil 49A by the sub-coil 50A. Because the role of the sub-coil 50A is to amplify magnetic flux by the main coil 49A, the DC input to the sub-coil 50A may be turned on and off according to the operation of the engine E.

Next, the operation of this first embodiment will be described. The coil unit 35A of the electromagnetic actuator 30A includes the main coil 49A, to which an AC with a waveform corresponding to vibrations of the engine E is input, and the sub-coil 50A, which amplifies magnetic flux generated by the main coil 49A. Therefore, the magnetic flux generated by the main coil 49A is amplified by magnetic flux generated by the sub-coil 50A. This can raise the level of the vibration force generated in the electromagnetic actuator 30A and increase the thrust exerted by the electromagnetic actuator 30A.

In addition, the sub-coil 50A is disposed adjacent to one end of the main coil 49A in the axial direction and coaxially with the main coil 49A. Thus, increase in the size of the coil unit 35A in the radial direction can be suppressed and slimming of the electromagnetic actuator 30A can be achieved to improve the layout when the electromagnetic actuator 30A is placed.

Figure 2:
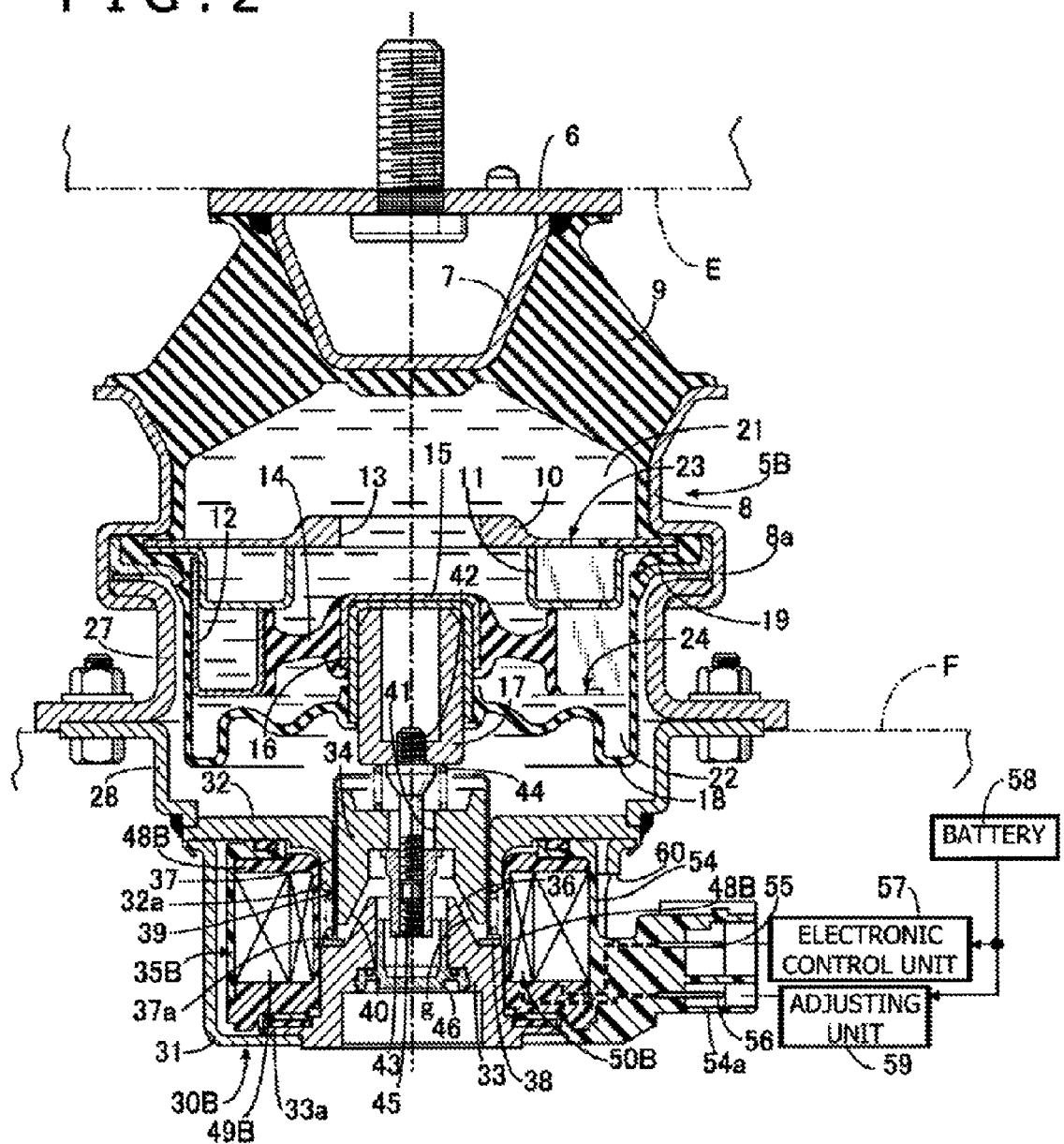
FIG. 2 is a longitudinal sectional view of an active vibration isolation system of a second embodiment.

A second embodiment of the present invention will be described with reference to FIG. 2. In this active vibration isolation system 5B, only the configuration of an electromagnetic actuator 30B is different from the above first embodiment. Therefore, the parts corresponding to the above first embodiment are only shown in the diagram with the same reference numerals and detailed description thereof is omitted.

The electromagnetic actuator 30B includes the housing 31 and the yoke 32 fastened to the housing 31 to close the upper end opening of the housing 31. The electromagnetic actuator 30B further includes the fixed core 33 fastened to the central part of the lower part of the housing 31, the movable core 34 opposed to the fixed core 33 from the upper side of the fixed core 33, and a coil unit 35B surrounding part of the fixed core 33 and the movable core 34.

The coil unit 35B includes a bobbin 48B that surrounds part of the fixed core 33 and the circular cylindrical part 32a of the yoke 32 and is made of a resin, and a main coil 49B and a sub-coil 50B that are fitted into this bobbin 48B.

The main coil 49B is wound around the sub-coil 50B wound around the bobbin 48B. That is, the sub-coil 50B is disposed radially outside and/or inside of the main coil 49B, i.e., abutting one of the inner circumferential side and outer circumferential side of the main coil 49B (inner circumferential side, in this second embodiment) and coaxially with the main coil 49B.

According to this second embodiment, the main coil 49B and the sub-coil 50B configuring the coil unit 35B overlap with each other in the radial direction. This can suppress increase in the size of the coil unit 35B in the axial direction and keep the position of the center of gravity low to stably hold the engine E.

Although the embodiments of the present invention are described above, the present invention is not limited to the above embodiments and various design changes can be made without departing from the present invention set forth in the scope of claims.

For example, in the above-described embodiments, a DC is input to the sub-coils 50A and 50B. However, an AC may be input. Furthermore, it is also possible to wind plural sub-coils around a bobbin in such a manner that the directions of magnetic flux with respect to the main coil are set identical to each other. In this case, the plural sub-coils are connected in series.

It should be understood by those skilled in the art that various modifications, combinations, sub-combinations and alterations may occur depending on design requirements and other factors insofar as they are within the scope of the appended claims or the equivalents thereof.

I claim:

1. An electromagnetic actuator for an active vibration isolation system, the electromagnetic actuator comprising:
    a vibration member having an axial direction and coupled to a vibration generation source;
    a fixed core arranged along the axial direction;
    a movable core arranged along the axial direction and is movable relative to the fixed core along the axial direction, the movable core being couple to the vibration member; and
    a coil unit that surrounds part of the fixed core and the movable core and is configured to cause the movable core and the vibration member to vibrate in a reciprocating manner, the coil unit comprising:
    a main coil that is energized by an alternating current with a waveform corresponding to vibrations of the vibration generation source to generate a magnetic flux to vibrate the movable core and the vibration member in a manner that suppresses the vibrations; and
    a sub-coil that is energized by a direct current and configured to amplify the magnetic flux generated by the main coil.

2. The electromagnetic actuator for an active vibration isolation system according to claim 1, wherein the sub-coil is disposed adjacent to one end of the main coil in the axial direction and coaxially with the main coil.

3. The electromagnetic actuator for an active vibration isolation system according to claim 1, wherein the sub-coil is disposed on a radially inner side of the main coil and coaxially with the main coil.

4. The electromagnetic actuator for an active vibration isolation system according to claim 1, wherein the sub-coil is disposed on a radially outer side of the main coil and coaxially with the main coil.

5. The electromagnetic actuator for an active vibration isolation system according to claim 1, wherein the vibration generation source is an engine of a vehicle.

* * * * *